US012578278B2

(12) United States Patent
Ostermeyer

(10) Patent No.: US 12,578,278 B2
(45) Date of Patent: Mar. 17, 2026

(54) COMMUNICATION BETWEEN AN OPTICAL MEASURING DEVICE AND TWO MEASURING CELLS ACCOMMODATED THEREIN

(71) Applicant: Anton Paar OptoTec GmbH, Seelze-Letter (DE)

(72) Inventor: Martin Ostermeyer, Gehrden (DE)

(73) Assignee: Anton Paar OptoTec GmbH, Seelze-Letter (DE)

( * ) Notice: Subject to any disclaimer, the term of this patent is extended or adjusted under 35 U.S.C. 154(b) by 276 days.

(21) Appl. No.: 18/302,618

(22) Filed: Apr. 18, 2023

(65) Prior Publication Data

US 2023/0341333 A1 Oct. 26, 2023

(30) Foreign Application Priority Data

Apr. 21, 2022 (DE) ...................... 10 2022 109 677.7

(51) Int. Cl.
| | |
|---|---|
| *G01N 21/88* | (2006.01) |
| *G01K 1/022* | (2021.01) |
| *G01N 21/90* | (2006.01) |

(52) U.S. Cl.
CPC ......... *G01N 21/8806* (2013.01); *G01K 1/022* (2013.01); *G01N 21/9036* (2013.01); *G01N 2021/8848* (2013.01); *G01N 2201/12* (2013.01)

(58) Field of Classification Search
CPC ........ G01N 21/35; G01N 21/03; G01N 30/30; G01N 33/44; G01N 35/085;
(Continued)

(56) References Cited

U.S. PATENT DOCUMENTS

| | | | |
|---|---|---|---|
| 6,870,148 | B2 | 3/2005 | Dietz et al. |
| 7,839,505 | B2 | 11/2010 | Masago et al. |

(Continued)

FOREIGN PATENT DOCUMENTS

| | | | |
|---|---|---|---|
| CN | 102288549 A | * | 12/2011 |
| DE | 3203094 A1 | | 8/1983 |

(Continued)

OTHER PUBLICATIONS

Dietz, Paul, et al., "Very Low-Cost Sensing and Communication Using Bidirectional LEDs," Mitsubishi Electric Research Laboratories, TR2003-35, Jul. 2003, 19 pages.
(Continued)

*Primary Examiner* — Michael P Stafira
(74) *Attorney, Agent, or Firm* — Dicke, Billig & Czaja, PLLC

(57) ABSTRACT

An optical measuring device having a polarization state generator to prepare a measuring light having a defined polarization state propagating along an analysis beam path, a receiving equipment arranged downstream of the polarization state generator to receive at least a first measuring cell and a second measuring cell, a polarization state analyzer arranged downstream of the receiving equipment, a detector for detecting an intensity of the measuring light, a stationary transmitting/receiving system to communicate with at least one of the first measuring cell and the second measuring cell and an evaluation and control unit for evaluating measuring signals from the detector and/or the polarization state analyzer and/or the polarization state generator taking into account information communicated between the stationary transmitting/receiving system and at least one of the two measuring cells.

18 Claims, 4 Drawing Sheets

(58) Field of Classification Search

CPC ........... G01N 35/1097; G01N 15/0205; G01N 35/00584; G01N 30/16; G01N 2030/324; G01N 30/24; G01N 30/461; G01N 30/466; G01N 30/88; G01N 35/0099; G01N 21/3577; G01N 33/491; G01N 33/74; G01N 2015/0288; G01N 2015/0294; G01N 2035/00881; G01N 30/6052; G01N 33/442; G01N 33/49; G01N 2021/0346; G01N 30/02; G01N 30/54; G01N 2035/0405; G01N 2035/0462; G01N 21/27; G01N 33/66; G01N 35/04; G01N 2333/726; G01N 35/028; G01N 21/0332; G01N 2021/0389; G01N 2035/00495; G01N 21/3581; G01N 35/10; G01N 35/1009; G01N 2035/0491; G01N 2035/1025; G01N 2035/1032; G01N 2201/02; G01N 2201/068; G01N 2500/00; G01N 35/00732; G01N 2035/0091; G01N 2030/885; G01N 21/6428; G01N 21/07; G01N 2500/10; G01N 21/6452; G01N 21/648; G01N 21/274; G01N 2410/02; G01N 2500/04; G01N 2800/7095; G01N 33/68; G01N 2030/625; G01N 2035/00326; G01N 30/60; G01N 35/00871; G01N 2035/1051; G01N 33/54306; G01N 33/54373; G01N 35/0092; G01N 35/1065; G01N 1/04; G01N 1/30; G01N 1/4055; G01N 21/253; G01N 21/314; G01N 21/552; G01N 21/6458; G01N 33/48; G01N 21/51; G01N 25/4866; G01N 15/0211; G01N 2001/302; G01N 2035/0422; G01N 27/3271; G01N 33/5041; G01N 35/00; G01N 35/00663; G01N 1/10; G01N 2030/628; G01N 2030/8429; G01N 2035/0094; G01N 2035/0425; G01N 2035/0489; G01N 21/31; G01N 21/3504; G01N 21/359; G01N 2800/26; G01N 30/84; G01N 1/38; G01N 2030/8886; G01N 33/487; G01N 33/5008; G01N 33/502; G01N 33/5091; G01N 33/5735; G01N 33/6842; G01N 33/6845; G01N 2015/1006; G01N 2021/6439; G01N 2035/00237; G01N 21/6486; G01N 21/8483; G01N 2201/12; G01N 27/221; G01N 2800/52; G01N 33/48785; G01N 33/582; G01N 35/00722; G01N 1/36; G01N 1/40; G01N 2021/3174; G01N 2030/027; G01N 2030/8813; G01N 2030/884; G01N 2030/8859; G01N 2035/00524; G01N 2035/1076; G01N 21/17; G01N 21/21; G01N 21/532; G01N 21/8806; G01N 2201/1215; G01N 2201/1293; G01N 25/18; G01N 27/025; G01N 27/07; G01N 33/24; G01N 33/48707; G01N 35/02; G01N 35/1011; G01N 35/1074; G01N 2015/0216; G01N 2015/03; G01N 2021/8848; G01N 2030/347; G01N 2035/00356; G01N 21/39; G01N 21/645; G01N 21/71; G01N 21/7743; G01N 21/9036; G01N 2201/06113; G01N 25/20; G01N 33/5011; G01N 33/5308; G01N 9/002; G01N 1/14; G01N 1/4077; G01N 1/44; G01N 15/14; G01N 17/02; G01N 2001/4027; G01N 2001/4083; G01N 2015/1493; G01N 2021/1704; G01N 2021/3125; G01N 2021/3137; G01N 2021/3188; G01N 2035/00455; G01N 2035/042; G01N 2035/0463; G01N 2035/1058; G01N 21/0303; G01N 21/1702; G01N 21/276; G01N 21/78; G01N 2201/0806; G01N 2333/4716; G01N 24/08; G01N 27/74; G01N 2800/16; G01N 30/90; G01N 33/0022; G01N 33/18; G01N 1/4005; G01N 15/0656; G01N 15/1012; G01N 15/1433; G01N 2015/12; G01N 2015/1014; G01N 2015/1486; G01N 2021/1738; G01N 2021/4707; G01N 2021/6471; G01N 2021/6484; G01N 2021/6491; G01N 2021/7783; G01N 2035/00435; G01N 21/01; G01N 21/05; G01N 21/3586; G01N 21/4133; G01N 21/6445; G01N 21/76; G01N 21/77; G01N 2201/0221; G01N 2201/024; G01N 2201/0415; G01N 2201/061; G01N 2201/064; G01N 2333/4719; G01N 2333/70589; G01N 2333/70596; G01N 25/482; G01N 27/447; G01N 27/72; G01N 2800/042; G01N 29/14; G01N 29/4445; G01N 29/4454; G01N 29/4481; G01N 29/449; G01N 3/56; G01N 31/22; G01N 33/4925; G01N 33/5005; G01N 33/5038; G01N 33/53; G01N 33/564; G01N 33/566; G01N 33/56966; G01N 33/56972; G01N 33/57415; G01N 35/00594; G01N 35/00693; G01N 35/0095; G01N 35/1095; G01N 1/2205; G01N 1/2273; G01N 1/34; G01N 15/06; G01N 15/075; G01N 15/1031; G01N 15/1429; G01N 15/1459; G01N 15/1468; G01N 2201/1427; G01N 2015/0038; G01N 2021/0168; G01N 2021/392; G01N 2021/399; G01N 2021/4769; G01N 2021/513; G01N 2021/598; G01N 2021/7759; G01N 2030/0045; G01N 2030/065; G01N 2035/00465; G01N 2035/0494; G01N 2035/103; G01N 21/255; G01N 21/45; G01N 21/4738; G01N 21/474; G01N 21/4785; G01N 21/5907; G01N 21/75; G01N 21/82; G01N 21/93; G01N 21/94; G01N 2201/126; G01N 2201/12707; G01N 23/20; G01N 23/20025; G01N 23/20033; G01N 23/2005; G01N 2333/475; G01N 2333/71; G01N 24/10; G01N 27/02; G01N 27/3272; G01N 27/3273; G01N 27/417; G01N 27/419; G01N 27/44756; G01N 30/06; G01N 30/34; G01N 30/72; G01N 30/74; G01N 31/227; G01N 33/1893; G01N 33/48735; G01N 33/50; G01N 33/574; G01N 33/57488; G01N 33/57492; G01N 33/6893; G01N 35/1002; G01N 35/1079; G01K 19/00; G01K 17/00; G01K 17/04; G01K 7/02; G01K 1/022

See application file for complete search history.

(56) References Cited

U.S. PATENT DOCUMENTS

| | | | |
|---|---|---|---|
| 8,922,773 B2 | 12/2014 | Wagner | |
| 10,267,727 B2 * | 4/2019 | Ostermeyer | G01N 21/211 |
| 2012/0236306 A1 * | 9/2012 | Ostermeyer | G01N 21/51 |
| | | | 356/440 |
| 2015/0157236 A1 | 6/2015 | Putz | |
| 2015/0157246 A1 | 6/2015 | Leszinske | |
| 2015/0276581 A1 * | 10/2015 | Ostermeyer | G01N 21/21 |
| | | | 356/367 |

FOREIGN PATENT DOCUMENTS

| | | | | |
|---|---|---|---|---|
| DE | 102009015393 B3 | 9/2010 | | |
| DE | 102012222039 A1 * | 6/2014 | | G01N 21/0303 |
| DE | 102011005807 B4 | 2/2017 | | |
| DE | 102015122687 A1 | 6/2017 | | |
| DE | 102018114449 A1 | 12/2019 | | |
| EA | 040443 B1 * | 6/2022 | | |
| JP | H063259 A | 1/1994 | | |
| JP | 2000046732 A | 2/2000 | | |
| JP | 4377416 B2 | 9/2009 | | |
| JP | 2010078470 A * | 4/2010 | | |
| WO | WO-2013184584 A1 * | 12/2013 | | A61B 5/150992 |

OTHER PUBLICATIONS

"Specification and Standard SPS-1 (2007*): Polarimetry and the International Sugar Scale—Official," ICUMSA Methods Book. Verlag Dr. Albert Bartens, 2007, 8 pages.

Kowalczyk, M., et al., "Photo-reception properties of common LEDs," Opto-Electronics Review 25.3 (2017), 7 pages.

Mims, Forrest M. III, "Sun photometer with light-emitting diodes as spectrally selective detectors," Appl. Opt. 31.33 (Nov. 1992), 3 pages.

Haydaroglu, Iskender, et al., "Energy harvesting and data transmitting microsystem using a light emitting diode," International Conference on Optical MEMS and Nanophotonics (Aug. 2011), 3 pages.

"The role of Metrology in Economic and social development," PTB-Mitteilungen 108, Apr. 1998, 89 pages.

German Search Report for Application No. 10 2022 109 677.7, dated Aug. 25, 2022, 10 pages.

* cited by examiner

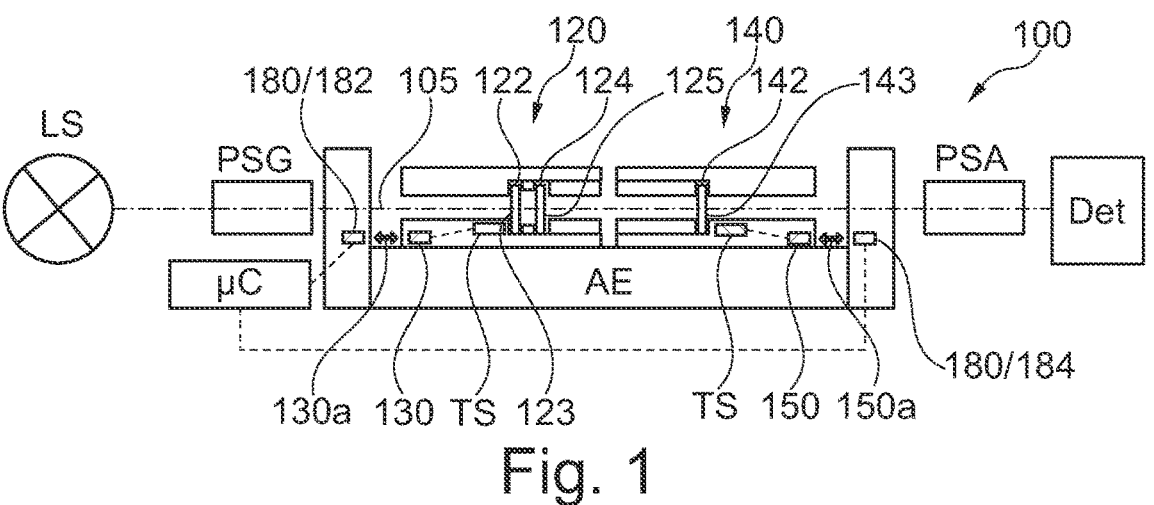
Fig. 1
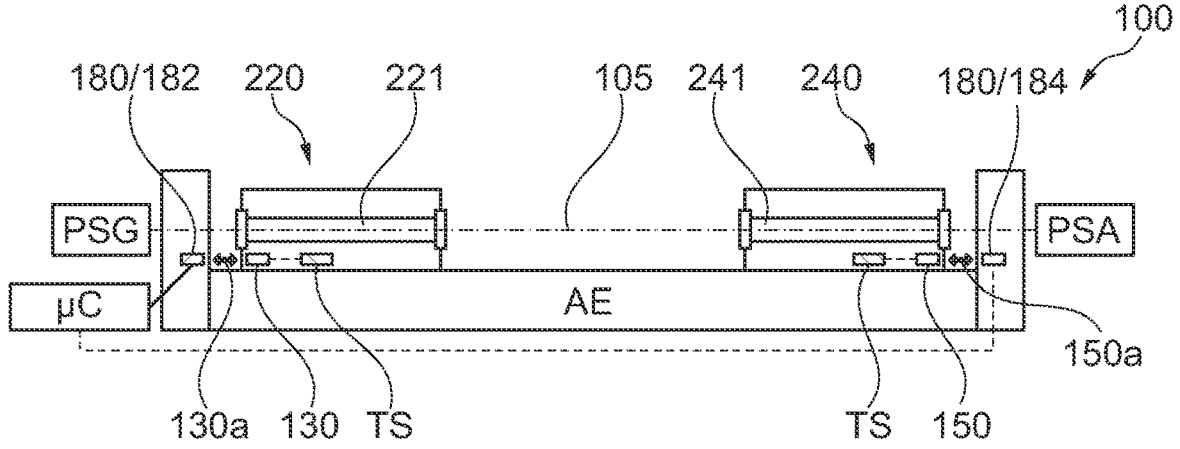
Fig. 2
Fig. 3

COMMUNICATION BETWEEN AN OPTICAL MEASURING DEVICE AND TWO MEASURING CELLS ACCOMMODATED THEREIN

This application claims priority to German Patent Application No. 10 2022 109 677.7 filed 21 Apr. 2022, the disclosure of which is hereby incorporated herein by reference.

TECHNICAL FIELD

The present disclosure relates to an optical measuring device for determining polarization-optical properties of a sample, a measuring cell for such an optical measuring device, a system comprising such an optical measuring device, and a method for determining polarization-optical properties of a sample using such an optical measuring device.

TECHNICAL BACKGROUND

Polarimeters are optical measuring devices that measure polarization-optical properties of samples. In particular, a polarimeter is used to measure the optical rotation of an optically active sample. A measured optical rotation angle of a linearly polarized measuring light depends on intrinsic properties of the sample under investigation and, in particular in the case of liquid samples, on their concentration. Polarimeters are therefore often used to quantitatively determine the concentration of optically active substances in solutions, such as for determining the sugar content of an aqueous solution (saccharimetry).

A prerequisite for error-free and accurate measurement is correct calibration of the polarimeter. For the calibration of polarimeters, so-called quartz control plates are used as calibration cells, in which one or more quartz discs with a defined rotation angle are arranged inside a tubular body. In modular quartz control plates, the quartz discs are removable and may be exchanged for other quartz discs if required, which in particular provide a different predetermined optical rotation of the polarization plane of the measuring light.

DE 10 2015 122687 A1 discloses a quartz control plate with a sensor measuring the current temperature and a transmitter connected downstream of the sensor, which may transmit its temperature readings to a receiver arranged independently of the sensor.

DE 10 2011 005807 B4 discloses that an information transmitter mounted in a measuring cell may transmit both the temperature of the measuring cell and other information about the measuring cell to the polarimeter.

The linearity of polarimeters may be checked by calibrating at several points of the rotation angle measuring range. For example, in the field of pharmaceutics it is often required that the calibration is carried out in such a way that at least one calibration point is above and at least one calibration point is below the rotation angle measurement value to be expected for a particular sample. This means that calibration must be performed with several quartz control plates. In the daily operation of a polarimeter, however, the joint handling of several quartz control plates is relatively cumbersome and error-prone, and also makes the unambiguous and error-free documentation required in particular in the pharmaceutical industry more difficult.

There may be a need to simplify the calibration of a polarimeter for several optical rotation angles.

SUMMARY OF THE DISCLOSURE

This need may be met by the subject matter of the independent patent claims. Advantageous embodiments of the present disclosure are described in the dependent claims.

In accordance with a first aspect of the disclosure, there is described an optical measuring device for determining polarization-optical properties of a sample. The optical measuring device comprises (a) a polarization state generator configured to prepare a measuring light having a defined polarization state propagating along an analyzing beam path; (b) a receiving equipment arranged downstream of the polarization state generator in the analyzing beam path and configured to receive (accommodate) at least a first measuring cell and a second measuring cell; (c) a polarization state analyzer arranged downstream of the receiving equipment in the analyzing beam path (d) a detector, which is arranged downstream of the polarization state analyzer in the analyzing beam path, for detecting an intensity of the measuring light; (e) a stationary transmitting/receiving system configured to communicate with the first measuring cell and/or with the second measuring cell and (f) an evaluation and control unit for evaluating measuring signals from the detector and/or from the polarization state analyzer and/or from the polarization state generator taking into account information communicated between the stationary transmitting/receiving system and at least one of the two measuring cells.

The described optical measuring device is based on the finding that the accuracy of the measurement of the optical activity of a preferably liquid sample or of an optical active reference element, which is used for calibration purposes, may be improved by an information exchange between the two measuring cells on the one hand and the stationary transmitting/receiving system on the other hand. The information exchange may in fact contain specific individual information for each measuring cell, which may be taken into account when evaluating the measuring signals and thus when determining the exact value for the optical activity of the sample, if necessary within the scope of a certain correction of the measured value.

The measuring cells mentioned are individually manageable measuring cells which may be inserted independently of each other into the (multiple) receiving equipment. In this way, several measurements may be carried out quickly and easily. With two measuring cells, this results in a total of three measurements, a first measurement with the first measuring cell only, a second measurement with the second measuring cell only, and a third measurement with both measuring cells.

The information may be information or data which is transmitted from the respective measuring cell to the stationary transmitting/receiving system. For this purpose, the respective measuring cell may have a memory as an information transmitter and a suitable mobile transmitting/receiving system, which communicates with the stationary transmitting/receiving system by wire or preferably wirelessly, in particular by means of electromagnetic waves (e.g. via RFID/NFC signals) and further in particular with optical (visible, ultraviolet and/or infrared) light.

In particular, the respective measuring cell may preferably have an electronic memory in which the information relating to the measuring cell concerned may be stored. Alternatively or in addition to the electronic memory, the respective measuring cell may have an optical pattern field as an information transmitter, in particular a barcode, with the information to be transmitted relating to the measuring cell or assigned to it being encoded in the barcode.

The information from or about the measuring cells may basically be any type of information that could be of importance for the measurement, for passing on the measurement data and/or for further use of the sample. As examples are mentioned here only: Identification data, calibration data, thermal properties of the sample and/or a sample container (e.g. a cuvette), geometry of at least a part of the measuring cell and material of at least a part of the measuring cell. Also information about possible optical defects (undesired possibly local double refractions, damage, contamination, etc.) of the measuring cell, which for example have been determined in advance by means of a special measuring machine, may be transmitted as significant information. Thus, the measuring cells located in the beam path may be individually characterized and/or uniquely identified by automatically evaluating the information from their respective information carrier and storing the information in a data memory of the evaluation and control unit. This also ensures traceability or retraceability and unambiguous and error-free documentation during further processing of the measuring data determined by the optical measuring device.

For many applications, particularly advantageously, the information/data transmitted to the stationary transmitting/receiving system may also be indicative of the current temperature of the respective measuring cell or of at least a part of the respective measuring cell. The relevant part of the respective measuring cell may be, for example, the contained sample or a contained (optically active) calibration element.

However, the information may also be information/data which is transmitted from the stationary transmitting/receiving system to the respective measuring cell and stored in its memory. Such data may be stored in the memory of a measuring cell during production or after measurement. Such data may include the identification information described above, geometry information and/or calibration information, in particular temperature calibration information. Furthermore, the data to be received may be provided for programming (in particular of a processor, which may be included in the information transmitter).

With regard to the information transmission in different directions described above, it should be noted at this point that in this document the term "transmitting/receiving system" may be a transmitting system, a receiving system or a transmitting and receiving system for both transmitting and receiving data, depending on the particular application. The same applies to the transmitting/receiving devices and the transmitting/receiving units described below.

In this document, the term "measuring cell" may be understood to mean two types of measuring cells: (a) calibration cells and (b) sample cells. A calibration cell is a measuring cell containing at least one optically active reference element, such as quartz, which comprises a rotation of the polarization by a well-defined rotation angle. Such a reference element may be, for example, a plate, for which reason such a reference element or even the entire calibration cell is often referred to as a quartz control plate. By means of a measurement of the optical activity of such a calibration cell, the described optical measuring device may be calibrated from time to time in order to provide permanently reliable measured values even over a longer period of operation. A sample cell typically comprises a sample receptacle. For liquid samples, the sample cell is usually a cuvette.

In this document, the term "downstream" means a direction within the described optical measuring device, which is defined by the propagation direction of the measuring light starting from a light source of the polarization generator.

According to an embodiment of the disclosure, the stationary transmitting/receiving system is configured to communicate wirelessly with the first measuring cell and/or with the second measuring cell. For such wireless communication, in principle any type of data transmission via the interface air may be used which has sufficient transmission reliability and bandwidth so that the respective desired information may be transmitted reliably and so quickly that the operation of the measuring device is not delayed and no errors occur during the transmission of information. Merely by way of example, it should be mentioned here that wireless communication may take place using NFC (Near Field Communication) or RFID (Radio Frequency Identification) signals. Optical data transmission, for example by means of visible or infrared light pulses, is also possible. For emitting optical signals and in particular for receiving optical signals, the "multi-stack diodes" or "multi-stack LEDs" described in more detail below are used in some exemplary embodiments.

Wireless communication may in particular advantageously facilitate the handling of the optical measuring device by an operator. When inserting, moving and/or removing measuring cells, the operator does not have to worry about avoiding possible damage to such cables.

According to a further embodiment of the disclosure, the stationary transmitting/receiving system comprises two transmitting/receiving devices, wherein a first stationary transmitting/receiving device of the two transmitting/receiving devices is assigned to the first measuring cell and the second stationary transmitting/receiving device of the two transmitting/receiving devices is assigned to the second measuring cell.

The two transmitting/receiving devices may preferably be mounted at different locations (on a chassis) of the optical measuring device. The two locations may be selected in such a way that the best possible communication link to the respective measuring cell is possible.

The data received by the respective stationary transmitting/receiving device may be transmitted directly or indirectly to the evaluation and control unit for further data processing. Indirect data transmission from the first stationary transmitting/receiving device may take place via the second stationary transmitting/receiving device.

According to a further embodiment of the disclosure, the stationary transmitting/receiving system is mounted to a chassis of the optical measuring device such that the stationary transmitting/receiving system is spaced apart from the first measuring cell and/or from the second measuring cell along a direction parallel to the optical axis of the measuring light.

In descriptive terms, this may mean that between the stationary transmitting/receiving system and a mobile transmitting/receiving system of the respective measuring cell there is an end coupling (front(al) coupling, face-to-face coupling) with respect to the measuring cell and/or with respect to the receiving equipment of the optical measuring device, by means of which the relevant information/data is transmitted. In an aforementioned embodiment with two transmitting/receiving devices, this may preferably apply to both stationary transmitting/receiving devices or only to the first stationary transmitting/receiving device or the second stationary transmitting/receiving device.

The described (front) end coupling may be designed in such a way that stable communication between measuring device and measuring cell is possible even if the measuring cell is inserted into the receiving equipment at different angular positions with respect to the optical axis of the measuring light. Stable communication is then also possible during a sequence of measurements at different angular positions in each case. With such a sequence, measurement errors that are dependent on the angular position of the measuring cell may be easily and advantageously averaged out.

According to a further embodiment of the disclosure, the stationary transmitting/receiving system comprises a plurality of stationary transmitting/receiving units distributed along a circumference around an optical axis of the measuring light. This has the advantage that even if the measuring cell is rotated around the optical axis, a stable coupling between the mobile transmitting/receiving system of the measuring cell and at least one of the transmitting/receiving units may always be ensured.

As mentioned above, measuring cells usually have optical errors that may never be completely avoided. Typical errors of polarimeter measuring cells are double refractions (birefringence) in their optically active elements as well as their contamination. These errors may cause the measured value of a polarimeter to change when the measuring cell is rotated around the optical axis of the measuring light. For this reason, relevant standards, such as those of the ICUMSA (International Commission for Uniform Methods of Sugar Analysis) or the OIML (Organisation Internationale de Métrologie Légale), prescribe that measuring cells be checked by rotation in the polarimeter or in a test rig (cf. page https://www.ptb.de/cms/ptb/fachabteilungen/abt4/fb-42/421-form-und-wellenfrontmetrologie/polarimetrische-kalibrierung-von-quarzkontrollplatten.html of the Physikalisch Technische Bundeanstalt (PTB)). In this case, the variation of the measured value must not exceed a specified limit value. If a calibration cell mentioned above is to be used for calibrating a polarimeter, it is therefore often necessary and/or required by standardization regulations that several measurements are carried out in different angular positions of the calibration cell. For this purpose, it must be possible to rotate the calibration cell in the sample chamber around its own axis or around the optical axis of the measuring light.

According to a further embodiment of the disclosure, the stationary transmitting/receiving system is mounted to a chassis of the optical measuring device such that the stationary transmitting/receiving system is spaced apart from the first measuring cell and/or from the second measuring cell along a direction perpendicular to the optical axis of the measuring light.

Such lateral coupling between the stationary transmitting/receiving system and a mobile transmitting/receiving system of the respective measuring cell may also ensure reliable transmission of information or data.

According to a further embodiment of the disclosure, the stationary transmitting/receiving system is further configured to transfer energy to the first measuring cell and/or the second measuring cell.

The energy transferred to the measuring cell concerned may be used for various tasks. For example, the mobile transmitting/receiving system may be operated with this energy. In some embodiments, a sensor, in particular a temperature sensor, may also be operated so that the measuring cell concerned may operate without its own energy source, such as a battery. The principle of the wireless energy transmission described, which is sometimes also referred to as "energy harvesting", and the electronic components required for this are known per se and are therefore not described in detail in this document.

According to a further embodiment of the disclosure, the optical measuring device further comprises (a) a first tempering device arranged and configured to temper the first measuring cell and (b) a second tempering device arranged and configured to temper the second measuring cell. The first and/or the second tempering device may be configured to bring the respective measuring cell to a desired temperature and/or to maintain a determined temperature as accurately as possible. The tempering device may include a heating element such as a heating wire or a heating coil. Peltier elements may also be used for cooling and/or heating. Suitable temperature control may be used to bring the measuring cells to a predetermined temperature that is most suitable for the respective measurement. This may further improve the accuracy of the optical measuring device.

The tempering devices may be operated particularly advantageously in applications in which two measuring cells are used, each of which has a temperature sensor that detects the current temperature of the respective measuring cell or at least the current temperature of a part of the respective measuring cell and transmits the corresponding temperature data wirelessly to the stationary transmitting/receiving system. The temperature data for both measuring cells may then be transferred (by wire) to the evaluation and control unit. This may then control each of the two tempering devices so that a desired target temperature is reached. Thus, the described transmitting/receiving system is a component of a temperature control circuit, which enables a further improvement of the measuring accuracy of the described optical measuring device.

At this point it is noted that the optical measuring device may also have more than two, for example three, four or even five tempering devices. This applies in particular to measuring devices that have a correspondingly high number of measuring cells. However, it is also possible for more than one tempering device to be assigned to a measuring cell and to ensure that it is tempered accordingly.

According to a further embodiment of the disclosure, the stationary transmitting/receiving system comprise at least one multi-stack diode, wherein the multi-stack diode is in particular a double-stack diode.

A multi-stack diode is an optoelectronic component in which two or more light-emitting or light-receiving or light-absorbing layers are arranged one above the other in a semiconductor material, i.e. in a semiconductor chip. In the case of a light-emitting diode (LED), this technique enables a higher emitted light intensity than in the case of simple light-emitting diodes with only one light-emitting layer. Furthermore, multi-stack diodes may also act as light receivers when illuminated as constituent of a suitable electronic circuit.

A multi-stack diode has the advantage that it has a particularly high efficiency in the conversion between electrical signals and optical signals. This applies in particular to a multi-stack diode, which serves as a light receiver and converts an optical signal, i.e. electromagnetic light waves (UV, visible, IR), into an electrical voltage signal. Similarly, a multi-stack LED generates comparatively intense optical signals with high efficiency. In this context, it is obvious that with such a double-stack diode a particularly good electromagnetic coupling between the described stationary transmitting/receiving system and the respective measuring cell or its mobile transmitting/receiving system may be realized. This applies both to data transmission and to energy transmission.

A double-stack diode is a diode in which two electrically, connected in series, light-emitting or light-absorbing layers are implemented on top of each other in the semiconductor chip. Due to this property, light-emitting double-stack diodes are also called double-stack emitters or double-stack LEDs.

Particularly efficient multi-stack diodes operate in the infrared (IR) spectral range. Due to their high optoelectronic conversion efficiency, they are also referred to as "high power IR emitters" or "high efficiency IR emitters". By means of a multi-stack diode, high voltages or high optical power densities may be achieved, as already described above. In the case of a multi-stack diode for energy reception, the relatively high voltage generated means that downstream electronics may be operated directly without a DC-DC converter, which may lead to both component and cost savings. The possibility of bidirectional use of the double-stack diode both for energy transmission and as a transmitter or receiver for data transmission means that further components may be saved. As a result, particularly cost-effective and compact systems may be realized.

In embodiments where the stationary transmitting/receiving system comprises (at least) two stationary transmitting/receiving devices or a plurality of stationary transmitting/receiving units, preferably each stationary transmitting/receiving device or each stationary transmitting/receiving unit comprises at least one such multi-stack diode.

It is noted that depending on the particular embodiment, a multi-stack diode may be used for a data transmission or for an energy transmission. Also a use for both a data transmission and an energy transmission is possible. In this case, within the framework of a time-division multiplexing process, determined time windows may be used or reserved for a data transmission and other time windows for an energy transmission.

It is further noted that the multi-stack diode described herein for (wireless) data transmission may also be used with optical measuring devices that have receiving equipment that may only receive a single measuring cell and not two measuring cells. Specifically, in this case, the receiving equipment of the optical measuring device described above is thus configured to receive only a single measuring cell. Accordingly, the stationary transmitting/receiving system need not be configured to communicate (simultaneously) with two measuring cells.

According to a further embodiment of the disclosure, the receiving equipment is further designed to receive a further measuring cell. The provision of a further receiving area for (at least) one further measuring cell may provide the described optical measuring device with greater flexibility with respect to the measuring cell receiving equipment. In the case of calibration measuring cells, the number of calibration points may be further increased, in particular by "combining through" or permuting the accommodated measuring cells, and thus the measuring accuracy may be further improved. In case there are several measuring cells in the beam path of the optical measuring device, each of the measuring cells may be individually identified with the respective temperature data.

According to a further embodiment of the disclosure, the stationary transmitting/receiving system is further configured to communicate also with the further measuring cell. As a result, the advantages of wireless information transmission described above with respect to the first measuring cell and with respect to the second measuring cell may also be realized for the further measuring cell and the operation of the described optical measuring device, which is naturally initially somewhat more complex with three measuring cells, may nevertheless be simplified.

It should be noted that a separate stationary transmitting/receiving device may also be provided for the further measuring cell, which then represents a component of the stationary transmitting/receiving system. Furthermore, the stationary transmitting/receiving system may also be configured to transfer energy to the further measuring cell and, if necessary, also to transfer energy to still further measuring cells. The optical measuring device may also have a further tempering device for the further measuring cell, by means of which the further measuring cell is tempered in a corresponding manner as the first and the second measuring cell.

According to a further aspect of the disclosure, a measuring cell for an optical measuring device for determining polarization-optical properties of a sample is described, in particular for an optical measuring device of the type described above. The described measuring cell comprises a first mobile transmitting/receiving system for wirelessly communicating with a first entity in a system consisting of the optical measuring device, the measuring cell and optionally at least one further measuring cell.

The described measuring cell is based on the finding that an (automatic) wireless exchange of information between the measuring cell and the first entity, which may be in particular the optical measuring device with a suitable stationary transmitting/receiving system, may facilitate the operation of the optical measuring device (for an operator) in daily analysis practice.

According to an embodiment of the disclosure, the measuring cell further comprises a second mobile transmitting/receiving system for wireless communication with a second entity. With the second mobile transmitting/receiving system, a comprehensive communication of the measuring cell with or a comprehensive communication between different (wireless) communication-capable components or entities of the aforementioned communication system may be realized.

According to a further embodiment of the disclosure, the measuring cell is a first measuring cell of at least two measuring cells. Further, the first entity is the optical measuring device and the second entity is a second measuring cell of the at least two measuring cells.

In descriptive terms, the described measuring cell has two functionalities. The first functionality is, as explained in detail earlier in this document, to communicate wirelessly with the optical measuring device or, more precisely, with a stationary transmitting/receiving system of the optical measuring device, thereby exchanging various types of measurement-related and/or sample-related information. The second functionality consists of forwarding such information, which is transmitted between (i) the second measuring cell or, more precisely, between the second mobile transmitting/receiving system of the second measuring device and (ii) the optical measuring device. In the second functionality, the described measuring cell thus merely represents an intermediate station in the communication between the optical measuring device and the second measuring cell.

According to a further embodiment of the disclosure, the measuring cell is a second measuring cell of at least three measuring cells for an optical measuring device. Further, the first entity is a first measuring cell of the at least three measuring cells and the second entity is a third measuring cell of the at least three measuring cells. In this embodiment, the described measuring cell represents, in descriptive terms, an intermediate station in the communication between two other measuring cells. In this case, at least one of the two other measuring cells also has two mobile transmitting/receiving systems, one of which communicates with the optical measuring device and the other of which communicates with the (second) measuring cell.

It should be noted that a system consisting of the optical measuring device and the three measuring cells may also be extended by adding further measuring cells of the type described here (each with two mobile transmitting/receiving systems).

According to a further embodiment of the disclosure, the first mobile transmitting/receiving system is configured to wirelessly receive energy, wherein the wirelessly received energy is provided in particular by a stationary transmitting/receiving system of the optical measuring device.

The energy transferred to the described measuring cell may be used for various tasks. Examples of "energy use" have already been explained above and will not be repeated here.

According to a further embodiment of the disclosure, the measuring cell is configured to receive energy from a transmitting/receiving system and to transfer at least part of the received energy to another measuring cell. Thus, (at least) two measuring cells may be supplied with energy from only one transmitting/receiving system in an advantageous manner.

For reasons of efficiency, the described transfer or forwarding of energy preferably takes place without an intermediate conversion of optical energy into electrical energy and then of part of the electrical energy into optical energy. The measuring cell described may decouple or extract the energy it needs itself using suitable optical components such as a beam splitter or a branching optical fiber.

It should be noted that the reception of energy from the transmitting/receiving system may also take place indirectly via another or additional measuring cell. Provided that this other or additional measuring cell is also capable of (at least partially) transmitting energy to the described measuring cell, in principle three (or more) measuring cells may also be supplied with energy by one and the same transmitting/receiving system.

According to a further embodiment of the disclosure, the first mobile transmitting/receiving system comprises at least one multi-stack diode, and in particular a double-stack diode.

The described measuring cell-side multi-stack diode has not only the already above described advantage of a particularly high efficiency in the conversion of electrical signals into optical signals. For the measuring cell described, it is particularly advantageous that the multi-stack diode used as a light receiver has a particularly high efficiency in converting optical signals (electromagnetic waves) into electrical signals (with a comparatively high voltage). The corresponding advantages, in particular the possibility of dispensing with a DC-DC converter and the possibility of using it for both power transmission and data communication, have already been explained above and will not be repeated here.

According to a further embodiment of the disclosure, the measuring cell further comprises an entrainment structure configured to couple with another entrainment structure of another measuring cell so that when the measuring cell is rotated about an optical axis of measuring light passing through the measuring cell and the other measuring cell, the other measuring cell is also rotated in the same manner.

The described entrainment structure advantageously allows the use of only one rotary drive for rotating both measuring cells. This simplifies the apparatus design of an optical measuring device that enables rotation of the measuring cells accommodated in its receiving equipment.

In particular, the entrainment structure may be a mechanical entrainment structure that engages with the other entrainment structure when the two measuring cells, i.e., the measuring cell described and the other measuring cell, are correctly received (accommodated). The entrainment structure may be formed in a variety of ways. The entrainment structure may establish a mechanical engagement that allows the other measuring cell to be driven rotationally in both possible directions of rotation. Alternatively, the entrainment structure may be designed to engage the other measuring cell along a circumferential direction around the optical axis from only one side or "angular direction" and thus, without "idling" the other measuring cell, may only provide for rotational movement of the other measuring cell along one direction of rotation.

According to a further embodiment of the disclosure, the measuring cell is a sample cell which has a sample receptacle for receiving a sample. In particular, the sample receptacle may be a cuvette for receiving a liquid sample.

According to a further embodiment of the disclosure, the measuring cell is a calibration cell for calibrating the optical measuring device. The function of a calibration cell and its importance for reliable and accurate measurement results have already been explained above and shall not be repeated here.

According to a further embodiment of the disclosure, the calibration cell has a reference element receptacle for receiving an optical reference element, wherein the optical reference element causes rotation of the plane of polarization from a linearly polarized measuring light by a predetermined rotation angle.

In preferred embodiments, the optical reference element is an integral (fixed) part of the calibration cell. In order to calibrate a polarimeter with different "reference rotation angles", at least (different) calibration cells must then be used. Such "fixed" calibration cells, manufactured with a high optical and/or mechanical precision, may make a valuable contribution to a particularly accurate and traceable calibration of a polarization-optical measuring device.

In principle, the optical reference element may be any type of optically active or optically rotating element. In particular, the optical reference element may be a crystal, preferably made of quartz.

According to a further embodiment of the disclosure, the calibration cell comprises at least one further reference element receptacle for receiving a further optical reference element, wherein the further optical reference element causes a rotation of the plane of polarization from a linearly polarized measuring light by a further predetermined rotation angle.

The two optical reference elements result in a combined reference rotation value. Therefore, the calibration cell described has a defined reference rotation value.

In particular, the calibration cell has two optical reference elements which are integral (fixed) components of the calibration cell and therefore cannot be removed. The two optical reference elements result in a combined reference rotation value. Therefore, the calibration cell described has a defined reference rotation value. This improves the traceability of the calibration cell and the unambiguous and error-free documentation of the calibration.

According to a further embodiment of the disclosure, the measuring cell further comprises a memory for storing information specific to the measuring cell, wherein the memory is communicatively coupled to the first mobile transmitting/receiving system, and wherein the first mobile transmitting/receiving system is configured to wirelessly transmit at least some of the information to the optical measuring device.

The specific information may comprise any kind of information which could be relevant for a measurement of the optical rotation induced by the measuring cell. Examples of such information are already mentioned in detail earlier in this document and shall not be further mentioned and discussed here.

According to a further embodiment of the disclosure, the measuring cell further comprises a sensor for measuring the current value of a physical quantity of at least one component of the measuring cell, wherein the sensor is directly or indirectly coupled to the first mobile transmitting/receiving system, and wherein the first mobile transmitting/receiving system is configured to wirelessly transmit the current value to the optical measuring device.

The physical quantity may be any physical quantity which has a (possibly also only relatively small) influence on the measured value determined by the optical measuring device. In the case of a calibration cell, for example, this influence may lead to a certain deviation of the optical rotation from the predetermined rotation angle under the present real measurement conditions.

According to a further embodiment of the disclosure, the sensor is a temperature sensor and the current value is a temperature value. Possible influences of the temperature of an optical reference element or the temperature of a sample on the exact value of the optical rotation and possible compensation measures are explained above and shall not be described again here.

According to another aspect of the disclosure, there is described a system for determining polarization-optical properties of a sample. The system comprises (a) an optical measuring device of the type described above, and (b) at least one measuring cell of the type described above.

According to a further aspect of the disclosure, there is described a method for determining polarization-optical properties of a sample using an optical measuring device of the type described above. The method comprises (a) transmitting at least a first information, which is indicative of a state and/or type of the first measuring cell, from the first measuring cell to the stationary transmitting/receiving system; (b) transmitting at least one second information, which is indicative of a state and/or the type of the second measuring cell, from the second measuring cell to the stationary transmitting/receiving system; and (c) evaluating measuring signals from the detector and/or from the polarization state analyzer and/or from the polarization state generator taking into account the first information and the second information.

Also the described method is based on the finding that the accuracy of the measurement of the optical activity of a (liquid) sample, which is located in a measuring cell formed as a sample cell, may be improved by an information exchange between (a) the first measuring cell and the second measuring cell on the one side and (b) the stationary transmitting/receiving system on the other side. Also the accuracy of a calibration using an optical reference element located in or at a measuring cell formed as a calibration cell may be improved by specific and current information about the calibration cell.

According to an embodiment of the disclosure, at least one of the first measuring cell and the second measuring cell is a calibration cell, wherein the calibration cell comprises a reference element receptacle and an optical reference element which is fixedly connected to the reference element receptacle, and wherein the calibration cell comprises a memory in which information characteristic of the calibration cell is stored.

The described storage of characteristic information in the memory of a calibration cell has the advantage that thereby a traceability or retraceability as well as an unambiguous assignment and traceable documentation of the measuring results may be achieved, which were determined by the optical measuring device with several measuring cells, wherein at least one measuring cell is a calibration cell. This applies in particular if the characteristic information contains unique identity information for the calibration cell concerned.

According to a further embodiment of the disclosure, the method is performed (a) with the optical measuring device of two tempering devices described above and (b) with two measuring cells of the type described above with a respective temperature sensor. According to this embodiment, the method further comprises (a) measuring a first temperature value for the first measuring cell, the first temperature value representing the first information; (b) measuring a second temperature value for the second measuring cell, the second temperature value representing the second information; (c) determining a (manipulated) variable based on the first temperature value and the second temperature value; and (d) controlling the first tempering device and the second tempering device based on the determined variable.

In descriptive terms, in this embodiment, temperature control of at least one of the two measuring cells is based on the two current temperature measurement data of the two measuring cells. This ensures a particularly high temperature stability of the measuring cells to be measured, which contributes to a further improvement of the measuring accuracy of the optical measuring device.

According to a further embodiment of the disclosure, the (manipulated) variable comprises a first (manipulated) variable for the first tempering device and a second (manipulated) variable for the second tempering device, wherein the first tempering device is controlled based on the first variable and independently of the second variable, and wherein the second tempering device is controlled based on the second variable and independently of the first variable.

In this embodiment, a separate control circuit is thus formed for each tempering device. Thus, each measuring cell may be controlled with its individually measured temperature in an advantageous way. This solution has proven advantageous in practice, in particular when there is comparatively little thermal coupling between the various control circuits.

According to a further embodiment of the disclosure, the variable is indicative of an average (mean) temperature between the first temperature value and the second temperature value. Further, the first tempering device and the second tempering device are both controlled based on the average temperature.

In this embodiment, a common control circuit is formed for both tempering devices. This represents a particularly simple temperature control, which is particularly suitable and completely sufficient if the two measuring cells have the same or at least very similar thermal masses and are thermally well coupled to each other, for example by a thermally well conducting common support.

According to a further embodiment of the disclosure, the variable is indicative of a weighted average temperature between (i) the first temperature value weighted by a first thermal mass of the first measuring cell, and (ii) the second temperature value weighted by a second thermal mass of the second measuring cell. Here, the first tempering device and the second tempering device are both controlled based on the weighted average temperature.

In this embodiment, which is also preferably carried out with good thermal coupling between the individual thermal masses, a common control circuit is formed for both tempering devices, resulting in particularly simple temperature control. However, compared to the "collective control" described above, this still very simple and thus error-robust control is supplemented by a weighting, preferably by a simple multiplicative weighting of the two temperature values with the respective thermal mass. The thermal mass may in particular simply be the heat capacity of the respective measuring cell. This depends in a known manner on the specific heat capacities and the masses of those materials which are present or installed in the respective measuring cell. Of course, this also includes the "material" of the sample (in the case of a sample cell) or the "material" of the optical reference element (in the case of a calibration cell).

The described procedure using the weighted average temperature may accelerate the temperature control, which may be of great advantage in particular when individual measuring cells are changed. The described weighting with the respective thermal mass "anticipates" a temperature equalization of the coupled thermal masses of the measuring cells.

It is noted that embodiments of the disclosure have been described with reference to different types of subject matter of the disclosure. In particular, some embodiments of the disclosure are described with reference to device claims and other embodiments of the disclosure are reference to described with method claims. However, it will immediately become clear to the person skilled in the art upon reading this application that, unless explicitly stated otherwise, in addition to a combination of features belonging to one type of subject matter of the disclosure, any combination of features belonging to different types of subject matter of the disclosure is also possible.

Further advantages and features of the present disclosure will be apparent from the following exemplary description of currently preferred embodiments.

BRIEF DESCRIPTION OF THE DRAWING

FIG. 1 shows according to an exemplary embodiment of the disclosure an optical measuring device, which is equipped with two calibration cells.

FIG. 2 shows an optical measuring device equipped with two sample cells.

FIG. 3 shows a part of an optical measuring device comprising a stationary transmitting/receiving system with a plurality of stationary transmitting/receiving units distributed along a circumference around an optical axis of the measuring light.

DETAILED DESCRIPTION

Figure 4:
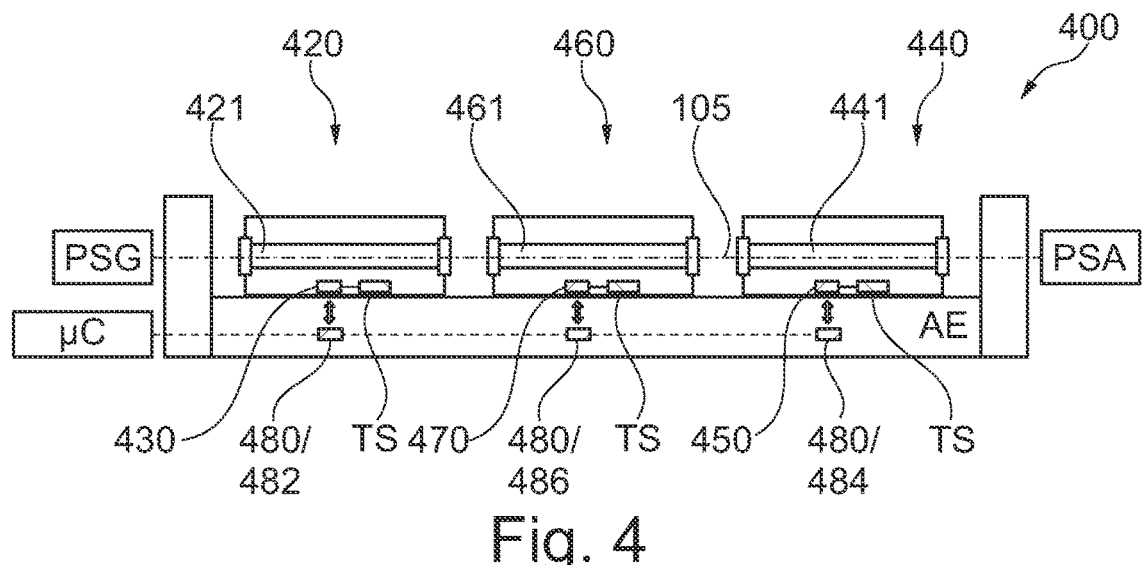
FIG. 4 shows an optical measuring device equipped with three sample cells, each of which communicates with a laterally arranged stationary transmitting/receiving device of a stationary transmitting/receiving system.

It is pointed out that in the following detailed description, features or components of different embodiments which are identical or at least functionally identical to the corresponding features or components of another embodiment are provided with the same reference signs or with reference signs which are identical in the last two digits to the reference signs of corresponding identical or at least functionally identical features or components. To avoid unnecessary repetitions, features or components already explained on the basis of a previously described embodiment will not be explained in detail at a later point.

It is further pointed out that the embodiments described below represent only a limited selection of possible embodiments of the disclosure. In particular, it is possible to combine the features of individual embodiments with each other in a suitable manner, so that a large number of different embodiments are to be regarded as obviously disclosed to the person skilled in the art by the embodiments explicitly shown here.

FIG. 1 shows an optical measuring device 100 according to a first embodiment of the disclosure. The optical measuring device 100, which is also referred to as a polarimeter, has a light source LS which emits a measuring light along an optical axis 105. The measuring light impinges on a polarization state generator PSG, which ensures in a known manner that only linearly polarized light continues to propagate along the optical axis 105 behind the polarization state generator PSG. The optical measuring device 100 further comprises a receiving equipment AE, which is arranged "downstream" of the polarization state generator PSG. So-called measuring cells may be inserted into the receiving equipment AE, which are penetrated by the measuring light. As already explained above, these measuring cells may be either calibration cells or sample cells. According to the example shown here, there are two calibration cells in the receiving equipment AE, a first calibration cell 120 and a second calibration cell 140.

Behind the receiving equipment AE there is a polarization state analyzer PSA and a light detector Det, for example a (sensitive) photodetector. The polarization state analyzer PSA ensures that only light with a determined linear polarization direction reaches the light detector Det. Light with a linear polarization direction perpendicular to this is blocked. By rotating an optical analysis element of the polarization state analyzer PSA, which is not shown, about the optical axis 105 and simultaneously observing the light intensity detected by the light detector Det, the polarization direction of the linearly polarized measuring light, which has rotated due to the influence of an optically active substance in at least one of the two measuring cells, may be determined. A rotation angle α, which describes the angular deviation of the polarization direction of the measuring light after the receiving equipment AE compared to the polarization direction of the measuring light before the receiving equipment AE, is in a known manner a direct measure for the optical activity of the optically active substance located in the respective measuring cell. The rotation angle α is determined based on state information from all existing optical components of the polarimeter 100 by an evaluation and control unit μC. The evaluation and control unit μC may be integrated in the polarimeter 100 and may be equipped with an input unit, such as a keyboard, data storage and data processing/program logic, and output unit. Alternatively, the evaluation and control unit μC may be operated externally via a computer and/or via an interface for data transmission. According to the exemplary embodiment shown here, the evaluation and control unit μC also takes into account information from and about the respective measuring cell 120, 140. Details of this are explained below.

As shown in FIG. 1, the receiving equipment AE contains two different calibration cells 120, 140. The first calibration cell 120 has two optical reference elements, each in the form of a quartz disc. One optical reference element 123 is located in a reference element receptacle 122 and another optical reference element 125 is located in a further reference element receptacle. According to the exemplary embodiment shown here, both quartz discs are fixed (integral) components of the calibration cell 120 and therefore cannot be removed or replaced by the user. Depending on the equipment of the two reference element receptacles 122 and 124 (for calibration purposes), different optical rotations may thus be generated for the measuring light.

The described use of two quartz discs within a calibration cell may become relevant, for example, if the calibration cell for the measuring light is to effect a small rotation angle, for example a rotation angle of less than 8°. Since it is not possible to produce very thin quartz discs with a sufficiently high accuracy (by means of grinding), it is often necessary to combine two somewhat thicker quartz discs, one made of a dextrorotatory quartz and the other of a levorotatory quartz with a slightly different thickness, so that the two rotations partially compensate each other. For small rotation values, moreover, a combination of a levorotatory quartz disc with a dextrorotatory quartz disc is prescribed by standardization committees.

As can be further seen from FIG. 1, the second calibration cell has only one optical reference element 143, which is located in a reference element receptacle 142. The optical reference element 143 is also formed by a quartz disc and is designed as an integral part of the calibration cell 140. It is apparent that by removing one of the two calibration cells 120, 140 (for calibration purposes), different optical rotations for the measuring light may be generated.

As already mentioned above, in order to achieve a particularly high measuring accuracy when determining the rotation angle α, the evaluation and control unit μC also takes into account information from and about the respective measuring cell 120, 140. This information may be, for example, identification data, calibration data (of the calibration measuring cells), which have been determined in particular in advance by means of a special measuring machine, the geometry and/or material of at least part of the measuring cell, etc. Since the optical activity of most substances, including quartz, has a known temperature dependence, the evaluation and control unit μC (here for calibration purposes) also takes into account the current temperature of the optical active substance, in this case the quartz discs, according to the exemplary embodiment shown here. These temperatures are each recorded by a temperature sensor TS and transmitted to the polarimeter 100 as information specific to the measuring cell.

The information transmission from the respective measuring cell 120, 140 to the evaluation and control unit μC is (preferably) wireless via electromagnetic waves at least on a part of the transmission path. According to the exemplary embodiment shown here, the information is transmitted via light, preferably light in the infrared (IR) spectral range. As already mentioned above, data, for example for programming a memory of the measuring cell 120, 140 not shown here, may optionally also be transmitted (optically) from the evaluation and control unit μC to the respective measuring cell 120, 140.

For such (possibly bidirectional) optical data transmission, both calibration cells have a mobile transmitting/ receiving system. Specifically, the first measuring cell 120 has a mobile transmitting/receiving system 130 and the second measuring cell 140 has a mobile transmitting/receiving system 150. On the other "communication" side, the polarimeter 100 has a stationary transmitting/receiving system 180 that is coupled (wire-bound as indicated by dashed lines) to the evaluation and control unit μC.

In order to realize the best possible communication link, the stationary transmitting/receiving system 180 of the polarimeter 100 comprises a first stationary transmitting/receiving device 182 and a second stationary transmitting/receiving device 184. As shown in FIG. 1, the first stationary transmitting/receiving device 182 is (spatially) associated with the mobile transmitting/receiving system 130 of the first measuring cell 120. The communication channel between the first stationary transmitting/receiving device 182 and the mobile transmitting/receiving system 130 is denoted by reference sign 130a. Similarly, the second stationary transmitting/receiving device 184 is (spatially) associated with the mobile transmitting/receiving system 150 of the second measuring cell 140. The communication channel between the second stationary transmitting/receiving device 184 and the mobile transmitting/receiving system 150 is denoted with the reference sign 150a.

The first measuring cell 120 preferably further comprises a memory, not shown here, for storing information specific to the measuring cell 120 (for example, identification data), wherein the memory is communicatively coupled to the mobile transmitting/receiving system 130 of the first measuring cell 120, and wherein the mobile transmitting/receiving system 130 is configured to wirelessly transmit at least some of the information to the polarimeter 100, more specifically to the first stationary transmitting/receiving device 182. The memory is preferably an electronic memory. Temperature sensor, memory, and/or mobile transmitting/receiving system (e.g., the diode or double-stack diode described below) may be located on the same circuit board.

Preferably, the second measuring cell 140 also has a memory, not shown here, for storing information specific to the measuring cell 140 (for example, identification data), wherein the memory is communicatively coupled to the mobile transmitting/receiving system 150 of the second measuring cell 140, and wherein the mobile transmitting/receiving system 150 is configured to wirelessly transmit at least some of the information to the polarimeter 100, more specifically to the second stationary transmitting/receiving device 184. Preferably, the memory is an electronic memory.

It is noted that the stationary transmitting/receiving system 180 (or its two stationary transmitting/receiving devices 182, 184) may be used to transmit not only data but also energy. A transfer of energy from the polarimeter to the measuring cells 120, 140 may be used to supply energy to those electronic components in the respective measuring cell 120, 140 that are required for the operation of the respective temperature sensor TS or the respective mobile transmitting/receiving system 130, 150. A double-stack diode may be used on the measuring cell side for receiving energy. For data transmission from the measuring cell to the stationary transmitting/receiving system, for example, a simple light-emitting diode or a simple photodiode may also be used.

FIG. 2 shows the optical measuring device 100, which is equipped with two sample cells. A first sample cell is marked with the reference sign 220 and has a sample volume 221 for receiving a preferably liquid sample. The second sample cell is marked with reference sign 240 and has a sample volume 241 also for receiving a preferably liquid sample.

Like the two calibration cells 120 and 140, the two sample cells 220 and 240 each have a temperature sensor TS (for measuring the sample temperature), a mobile transmitting/receiving system 130 and 150, respectively, and preferably a memory not shown here. The communication links of the two mobile transmitting/receiving systems 130, 150 with the polarimeter 100 do not differ from those of the two calibration cells 120, 140 (with the polarimeter 100) shown in FIG. 1 and are therefore not described again here.

In the embodiments described in FIGS. 1 and 2, both the calibration cells 120 and 140 and the sample cells 220 and 240 of the optical measuring device 100 may each be rotated about the optical axis 105. This is preferably done manually by a user. This allows measurements of the rotation value in different orientations of the measuring cells.

FIG. 3 shows a part of an optical measuring device according to a further exemplary embodiment of the disclosure. Shown is only a part of the receiving equipment AE as well as one of the two inserted sample cells, namely the second sample cell 240. Also in this embodiment, the sample cell 240 may be rotated around the optical axis 105. By measuring the optical activity of a sample at different angular positions and subsequently averaging the respective measured optical rotation angles, the measurement accuracy of the polarimeter may be improved in a known manner.

For the desired rotation of the sample cell 240, according to the exemplary embodiment shown here, a schematically illustrated rotary drive 363 is provided, which interacts mechanically with an outer edge of the sample cell 240 and may cause a defined rotation of the sample cell 240 when activated accordingly. In other embodiments, a (motorized rotary drive) is not provided, so that the rotation of the sample cell must be performed manually by an operator. A memory already mentioned above with reference to FIG. 1 for calibration cells, in which information specific to the sample cell 240 is stored, is marked in FIG. 3 with reference sign 364.

Since the mobile transmitting/receiving system 150, as shown in FIG. 3, is located relatively far outside the optical axis 105, if only one stationary transmitting/receiving device 184 were associated with the sample cell 240, as shown in FIG. 2, the length of the communication link between the mobile transmitting/receiving system 150 would change when the sample cell 240 is rotated. This would lead to an undesired reliability depending on the respective angular position of the sample cell 240 and possibly to disturbances of the communication link. Therefore, according to the exemplary embodiment shown herein, the second stationary transmitting/receiving device 384 comprises a plurality of stationary transmitting/receiving units 388 distributed along a circumference around the optical axis 105. As a result, stable (optical) coupling between the mobile transmitting/receiving system 150 of the measuring cell 240 and at least one of the stationary transmitting/receiving units 388 of the stationary transmitting/receiving device 384 may always be further improved even when the sample cell 240 is rotated around the optical axis 105.

FIG. 4 shows an optical measuring device 400 according to a further exemplary embodiment of the disclosure. The optical measuring device 400 is shown in an operating state in which three measuring cells are accommodated in the receiving equipment AE. All three measuring cells are sample cells, wherein a first sample cell is denoted by reference sign 420, a second sample cell is denoted by reference sign 440, and the third sample cell is denoted by reference sign 460. Each sample cell has a respective sample volume, which is marked with the reference signs 421, 441, and 461, respectively. Furthermore, each sample cell has a mobile transmitting/receiving system, which is marked with the reference signs 430, 450 and 470.

To enable each of the measuring cells 420, 440 and 460 to reliably communicate with the optical measuring device 400, the latter has a stationary transmitting/receiving system 480, which has three stationary transmitting/receiving devices, a first stationary transmitting/receiving device 482, a second stationary transmitting/receiving device 484 and a third stationary transmitting/receiving device 486. As can be seen from the respective spatial spacing, the first stationary transmit/receive device 482 is assigned to the first mobile transmitting/receiving system of the first measuring cell 420. Similarly, the second stationary transmitting/receiving device 484 is associated with the second mobile transmitting/receiving system 450 of the second measuring cell 440, and the third stationary transmitting/receiving device 486 is associated with the third mobile transmitting/receiving system 470 of the third measuring cell 460.

As shown in FIG. 4, each of the three measuring cells 420, 440 and 460 also has a temperature sensor TS which transmits temperature data to the respective mobile transmitting/receiving system 430, 450 and 470, respectively, so that these may be sent wirelessly to the optical measuring device 400 or, more specifically, to the evaluation and control unit μC of the optical measuring device 400 via the respective stationary transmitting/receiving device 482, 484 and 486, respectively.

In descriptive terms, there is a "lateral" coupling between the mobile transmitting/receiving systems 430, 450 and 470, each with a stationary transmitting/receiving device 482, 484 and 486, respectively. This allows each measuring cell to transmit its temperature data, among others, independently of the other measuring cells 420, 440, 460 to the control unit μC of the optical measuring device 400 via its own wireless communication channel.

It is noted that the mobile transmitting/receiving systems 430, 450 and 470 may also each have an annular antenna that is wrapped around the respective measuring cell 420, 440 or 460. This would also enable stable wireless coupling between the measuring cell 420, 440, 460 and optical measuring device 400 in the exemplary embodiment shown here even if the respective measuring cell were to be rotated around the optical axis 105, for example, for the reasons explained above during a series of measurements with different sample angular positions.

It is further noted that the stationary transmitting/receiving devices may be realized as optoelectronic components corresponding to a light chain or also as transmitting/receiving devices that may communicate with the mobile transmitting/receiving system 150 via radio waves such as RFID signals, depending on the specific requirements of the respective application. The same applies to all other embodiments described in this document with respect to wireless coupling between a measuring cell and the respective optical measuring device.

Figure 5:
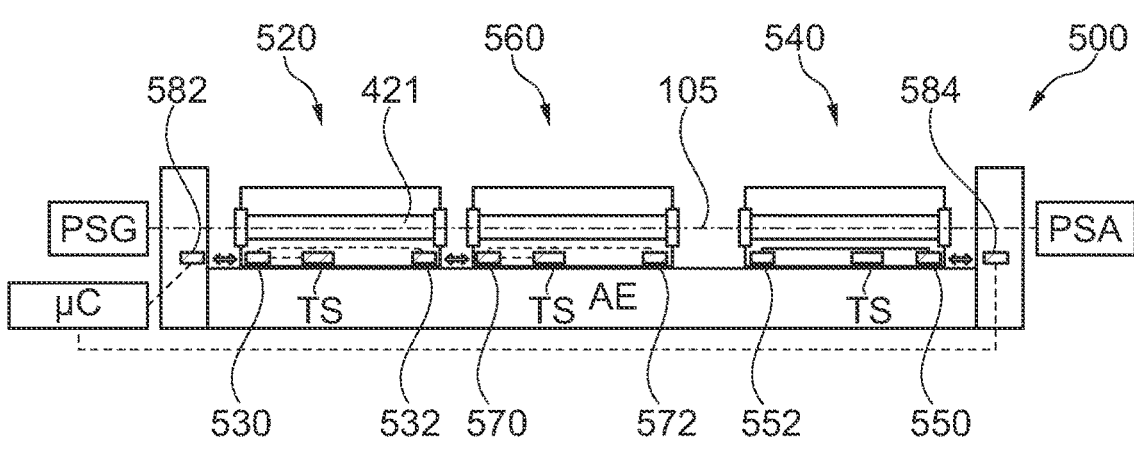
FIG. 5 shows an optical measuring device equipped with three sample cells, where two sample cells communicate with a stationary transmitting/receiving device at each front end and one sample cell communicates with an adjacent sample cell at the front end, which has two mobile transmitting/receiving systems.

FIG. 5 shows an optical measuring device 500, which is also equipped with three sample cells. A first sample cell is marked with the reference sign 520, a second sample cell is marked with the reference sign 540 and the third sample cell is marked with the reference sign 560. Again, each sample cell has a respective sample volume, not provided with a reference sign, for receiving a preferably liquid optically active sample. In contrast to the optical measuring device 400, in which the sample cells each communicate with a stationary transmitting/receiving device mounted laterally in or on the receiving equipment AE, in the optical measuring device 500 a front end coupling takes place. Such a front end coupling is shown in FIGS. 1, 2 and 3 for the case of two measuring cells and explained above.

To realize the front end coupling, a stationary transmitting/receiving system of the optical measuring device 500 such as the optical measuring device 200 shown in FIG. 2 has two stationary transmitting/receiving devices, a first stationary transmitting/receiving device 182 and a second stationary transmitting/receiving device 184. Since only two measuring cells 520 and 540 of the three measuring cells 520, 540 and 560 may be spatially close to the stationary transmitting/receiving system with the two stationary transmitting/receiving devices 582 and 584, a stable coupling of the third measuring cell 560 to the optical measuring device 500 may only be achieved via an indirect coupling via one of the other two measuring cells 520 or 540. Accordingly, at least this other measuring cell must have two at least logically separate mobile transmitting/receiving systems, one of the two mobile transmitting/receiving systems communicating with the optical measuring device 500 and the other of the two mobile transmitting/receiving systems communicating with the third measuring cell.

According to the exemplary embodiment shown here, the third measuring cell 560 communicates indirectly via the first measuring cell 520 with the evaluation and control unit µC of the optical measuring device 500. For this purpose, the first measuring cell 520 has a first mobile transmitting/receiving system 530 that forms a communication channel with the stationary transmitting/receiving device 582, which is illustrated with a double arrow in FIG. 5. Furthermore, the first measuring cell 520 has a second mobile transmitting/receiving system 532, which forms a further communication channel with a first mobile transmitting/receiving system 570 of the third measuring cell 560, also illustrated with a double arrow.

In order to enable free interchangeability of the different measuring cells, according to the exemplary embodiment shown here, all measuring cells are of the same design. As a result, each of the measuring cells 520, 540 and 560 may act as the measuring cell that forwards communication signals between another measuring cell and the evaluation and control unit µC of the optical measuring device 500. It is even possible that the middle third measuring cell 560 also communicates with the evaluation and control unit µC via both the second measuring cell 540 and the second stationary transmitting/receiving device.

Specifically, therefore, (in FIG. 5) the third measuring cell 560 also has a second mobile transmitting/receiving system 572 in addition to the first mobile transmitting/receiving system 570. Furthermore, the second measuring cell 540 also has two mobile transmitting/receiving systems, namely a first mobile transmitting/receiving system 550 and a second mobile transmitting/receiving system 552.

Figure 6:
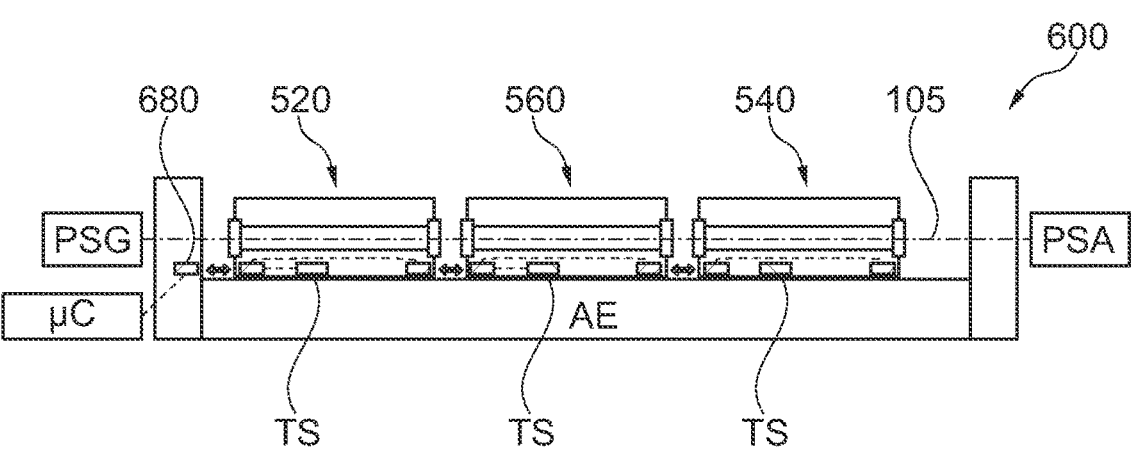
FIG. 6 shows an optical measuring device equipped with three sample cells, wherein a first sample cell communicates with a stationary transmitting/receiving system at the front end and the other two sample cells communicate directly or indirectly with the first sample cell at the front end.

FIG. 6 shows an optical measuring device 600, which is also equipped with three sample cells 520, 540 and 560. In this embodiment, the stationary transmitting/receiving system 680 consists only of a single stationary transmitting/receiving device, which (as an example) is arranged at the rear area of the receiving equipment AE as seen from a light source of the polarization state generator PSG. This means that according to the exemplary embodiment shown here, the transmitting/receiving system 680 directly couples only with the measuring cell 520 communicatively and, if necessary, also energetically. The coupling with the (middle) measuring cell 560 takes place indirectly via the two mobile transmitting/receiving systems of the measuring cell 520. The coupling of the transmitting/receiving system 680 with the (right) measuring cell 540 takes place twice indirectly via both the middle measuring cell 560 and the measuring cell 520 shown on the left in FIG. 6.

Figures 7A, 7B, 8, 9A:
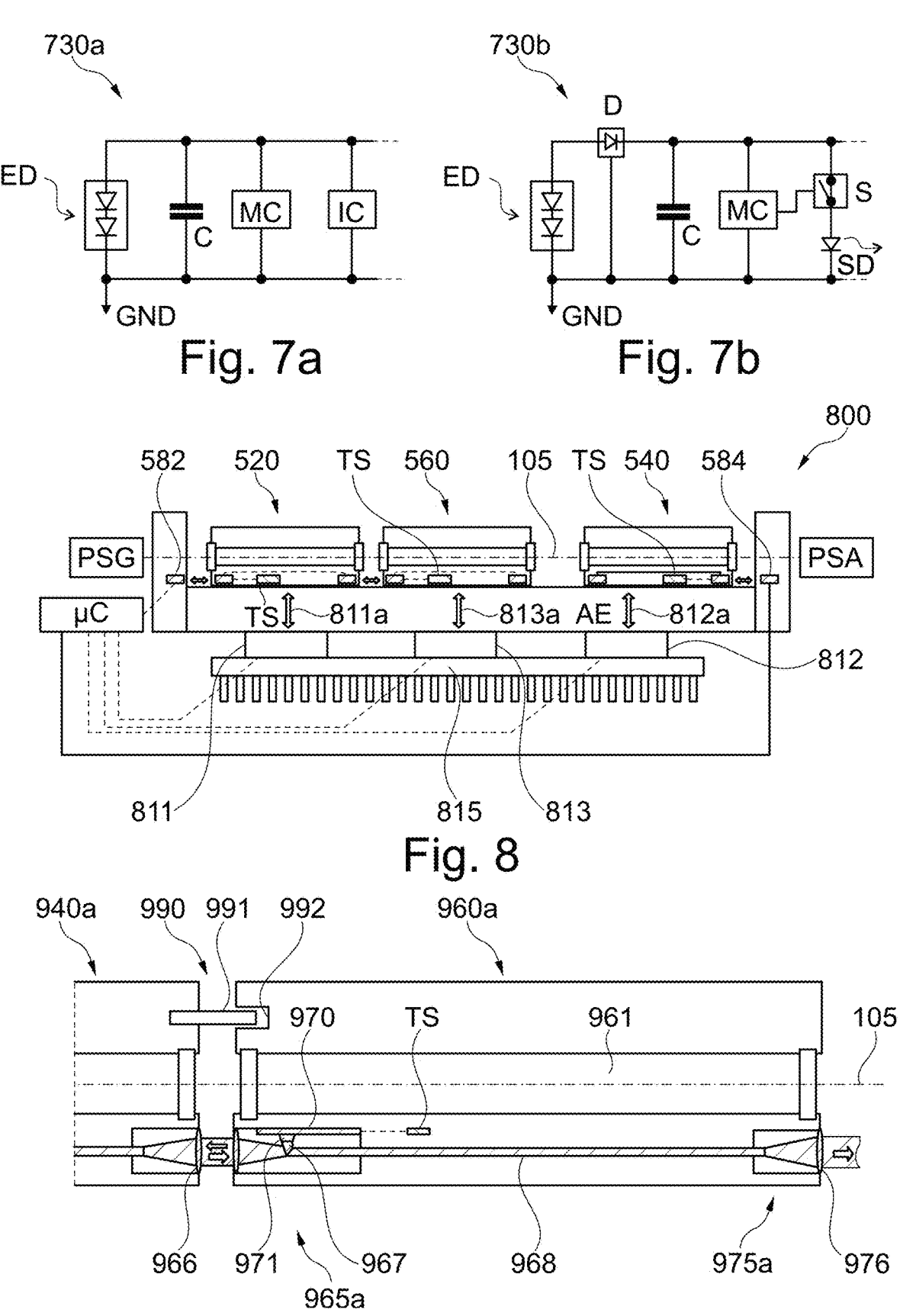
FIGS. 7a and 7b illustrate in simplified form a portion of an electronic circuit for a mobile transmitting/receiving system and for a stationary transmitting/receiving system, respectively, with a light-receiving double-stack diode.
FIG. 8 shows an optical measuring device equipped with three sample cells and a tempering device for each sample cell.
FIGS. 9a to 9d each show a sample measuring cell with an optical system for passing optical communication signals to another sample measuring cell.

FIGS. 7a and 7b illustrate a simplified view of a portion of an electronic circuit for a mobile transmit/receive system 730a and 730b, respectively. A similar circuit may also be used for a stationary transmit/receive system.

The electronic circuit of the mobile transmitting/receiving system 730a has as a "communicative" element a double-stack diode ED, which receives optical signals according to the exemplary embodiment or operating state shown here. In other embodiments or other operating states, the double-stack LED ED may also function as an optical transmitting element. One electrical terminal contact of the double-stack diode ED is connected to a ground potential GND, and the other electrical terminal contact is provided for the electrical signals generated by the double-stack diode ED in response to receiving optical communication input signals.

The electronic circuit 730a has a parallel circuit comprising a capacitor C, a microcontroller MC and a suitable integrated circuit chip IC for signal processing and/or in the "transmitting case" for controlling a data transmitting diode SD not shown in FIG. 7a. The capacitor C functions as an (energy) storage capacitor, which is supplied by the output signals of the double-stack diode ED in the receiving case and ensures a continuous energy supply to the microcontroller MC and the chip IC.

The double-stack diode ED has the advantage that, compared to simple receiving diodes (for example photodiodes or light-emitting diodes acting as receivers), it generates electrical signals with a comparatively high voltage level in response to receiving optical signals. This makes it possible to dispense with a DC-DC converter in the electronic circuit. As discussed above, the electronic circuit 730a may thus be operated without a DC-DC converter, which may result in both component and cost savings. The "omission" of a DC-DC converter also leads to a reduction in the energy or power requirements of the (mobile) transmitting/receiving system 730a, so that an energy storage device such as a battery for operating the measuring cell concerned may be dispensed with in an advantageous manner.

The circuit 730b shown in simplified form in FIG. 7b represents a preferred embodiment for a mobile transmitting/receiving system. The circuit 730b enables communication in so-called duplex mode. This means that time windows for a power transmission to the measuring cell and time windows for a data transport from the measuring cell to a stationary transmitting/receiving device of the optical measuring device concerned, which is not shown here, alternate. Switching between energy transmission and communication/data transport is performed by a switch S.

In circuit 730b, a double-stack diode ED is again responsible for energy reception. Data is sent to the optical measuring device concerned during pauses in the "energy transmission" with a usual light-emitting diode SD. A diode D prevents the storage capacitor C from being discharged by the non-illuminated double-stack diode ED during energy transmission pauses.

FIG. 8 shows an optical measuring device 800, which is equipped with three sample cells/measuring cells. The optical measuring device 800 communicates with the sample cells 520, 540 and 560 as described above with reference to FIG. 5.

The optical measuring device 800 has a tempering device for each sample cell. The tempering devices are each directly or indirectly attached to the receiving equipment AE. According to the exemplary embodiment shown here, the tempering devices are Peltier elements which may cause a temperature increase or a temperature decrease of the respective measuring cell depending on the direction of a current flowing through them.

Specifically, the optical measuring device 800 includes (a) a first tempering device 811 thermally coupled to the first measuring cell 520, (b) a second tempering device 812 thermally coupled to the second measuring cell 540, and (c) a third tempering device 813 thermally coupled to the third measuring cell 560. The corresponding thermal couplings are illustrated in FIG. 8 with double arrows 811a, 812a and 813a, respectively.

A common heat sink 815, to which the Peltier elements of all three tempering devices are thermally connected, provides a temperature exchange with the environment. This enables the tempering devices 811, 812 and 813 to provide effective heat transfer.

In the following, some basic considerations of the inventor on the question of the best possible temperature control of several measuring cells inserted in an optical measuring device are explained.

Measuring cells should usually be tempered to a reference temperature in order to be able to directly compare the measured values for the respective optical rotation with a reference value. The time required from filling a liquid sample into a sample cell or from inserting a measuring cell (sample cell or calibration cell) to reach a desired temperature largely determines the total time the user has to spend for a measurement. It is obvious that a reduction of this total time is desirable. Temperature control for a single measuring cell is comparatively easy to implement. The situation is different for several measuring cells that are inserted simultaneously in a receiving equipment of an optical measuring device and are to be tempered. Here, additional requirements are placed on the temperature control.

For example, if two measuring cells, a first measuring cell M1 and a second measuring cell M2, are inserted into the receiving equipment with current temperatures of T1 and T2, respectively, and are already tempered to a target temperature T0 (T0=T1=T2), then the receiving equipment will also have a temperature close to the target temperature TO. Deviations of the temperature of the receiving equipment from the target temperature depend on the ambient temperature.

If, for example, the second measuring cell M2 is now removed and replaced by a third measuring cell M3 with an initial/current temperature T3 that is higher than T0 (T3>T0), then a temperature compensation is initiated due to thermal couplings. This will cause the newly inserted measuring cell M3 to become colder and both the remaining initial measuring cell M1 and the receiving equipment to become warmer. How fast and to what extent this happens depends on the thermal masses of the measuring cells and the receiving equipment. Good temperature control will ensure that all measuring cells reach the target temperature as quickly as possible. Several temperature control procedures are possible for this:

1. Joint Regulation to a Medium Temperature:

The temperatures read from the various measuring cells are averaged. A simple controller controls the tempering devices together. This temperature control may be realized in a particularly simple way, which nevertheless leads to good results in many cases, in particular when the measuring cells have approximately the same thermal masses.

2. Joint Control to a Weighted Average Temperature:

Here, the possibly different thermal masses of the measuring cells involved are taken into account. Information about the thermal masses may be read out via the communication between the measuring cell and the optical measuring device explained in detail above. The read-out temperatures of the measuring cells are then weighted with their individual thermal masses and an average value is calculated from this. This is used for the joint control of the tempering devices. This control approach speeds up control in particular when individual measuring cells are changed. This is due to the fact that the weighting anticipates the compensation of the coupled thermal masses of the measuring cells.

3. Individual Temperature Control for Different Areas:

For this purpose, an optical measuring device should preferably be used, in which several tempering devices, as shown in FIG. 8, are mounted in or on the receiving equipment one after the other in the direction of the beam. A separate control circuit is then formed for each measuring cell. A control circuit comprises the respective measuring cell or, more precisely, its temperature sensor and the tempering device which is spatially closest to the respective measuring cell. Thus, in principle, the temperature of each measuring cell may be controlled by means of its individually measured temperature. This approach works particularly well when the thermal coupling between the control circuits is comparatively low.

4. General State Controller:

With the aid of specific thermal information from the individual measuring cells, preferably transmitted via the communication links described above, a thermal model of the overall system may be formed. A so-called state controller may model this system with the aid of the measured temperatures and control it in a particularly efficient manner.

FIGS. 9a to 9d each show a sample measuring cell with an optical system for passing optical signals to another sample measuring cell. As explained below, the optical signals in the exemplary embodiments described here are used both for a transmission of communication data and for a transmission of energy. In each case, the optical system comprises at least an optical waveguide, which is arranged somewhat outside the optical axis of the optical measuring device. Therefore, the measuring cells involved require a fixed (angular) orientation among each other. This fixed orientation may be achieved by means of suitable mechanical structures on the measuring cells involved, which engage with each other when the sample cells are measured together. This may be done, for example, by means of pins on the end face which are firmly pressed into one measuring cell and which engage in a suitably dimensioned hole in the other measuring cell, thereby causing an entrainment when one measuring cell is rotated. Then both (or even more than two) cells may be rotated together in the receiving equipment about the optical axis 105 in an interconnection that cannot be rotated with respect to each other.

It should be noted that the following description of optical coupling between different measuring cells using an optical waveguide is based on sample cells. Of course, this optical coupling may also be realized just as well between calibration cells.

In the embodiment shown in FIG. 9a, only a part of a sample cell 940a is shown on the left, which mechanically engages another sample cell 960a. A schematically shown entrainment structure 990 provides the above-mentioned mutually non-rotatable interconnection of the two cells 940a and 960a. The entrainment structure 990 comprises a pin-shaped entrainment element 991 and an engagement opening on the side of the sample cell 960a.

As shown in FIG. 9a, the sample cell 960a has an optical waveguide 968 arranged radially outside a sample volume 961. An optical coupling system 965a provides optical coupling between the two sample cells 940a and 960a. An optical coupling system 975a may provide optical coupling with another sample cell not shown. The optical coupling systems 965a and 975a each include a lens 966 and 976, respectively, which provide suitable collimation of the light waves of the transmitted optical signals that are transmitted over the optical waveguide 968. In descriptive terms, the light is guided through the sample cell 960a by the optical waveguide 968 and collimated at the other end in such a way that another sample cell may be supplied with optical signals.

In order to be supplied with optical signals itself and to send optical signals to the respective optical measuring device, the sample cell 960a only diverts a part of the light by means of a beam splitter 967. As explained above, this light may serve both for a data transport and for an energetic coupling or an energy supply of the sample cell 960a. For two sample cells in series, a beam splitter reflectivity of 50% maximizes the energy reaching the rear sample cell. With three sample cells, a beam splitter reflectivity of 33% leads to an optimal energy distribution of the two rear sample cells.

As further shown in FIG. 9a, the sample cell 960a further comprises a temperature sensor TS, a mobile transmitting/receiving system 970 and a transmitting/receiving diode 971. The meanings and functions of these components TS, 970 and 971 have already been explained in detail above and, in order not to increase the scope of this document further, will not be repeated here.

Figure 9B:
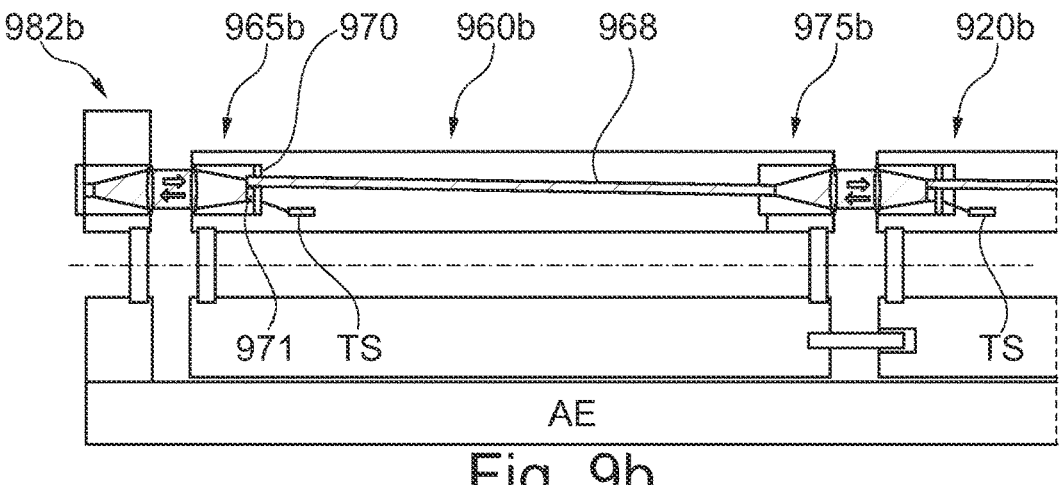

In the embodiment of a sample cell 960b shown in FIG. 9b, which is optically coupled to a stationary transmitting/receiving device 982b of the optical measuring device concerned and to a further sample cell 920b, the optical coupling systems 965b and 975b are designed in such a way that a beam splitter may be dispensed with. Instead, one end of the optical waveguide 968 and the transmitting/receiving diode 971 of the mobile transmitting/receiving system (in the receiving case) are jointly illuminated by light emitted by the stationary transmitting/receiving device 982b.

Figure 9C:
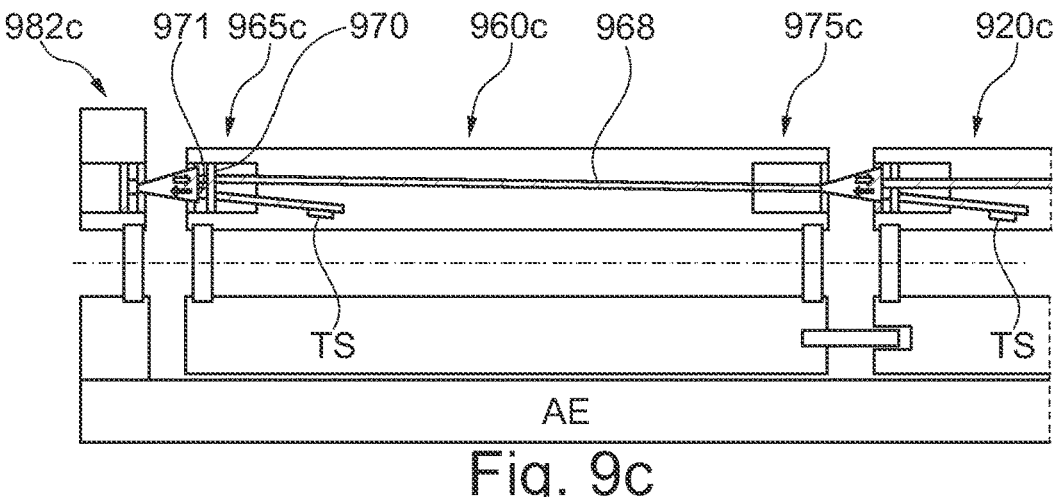

In the embodiment of a sample cell 960c shown in FIG. 9c, which is optically coupled to a stationary transmitting/receiving device 982c of the respective optical measuring device and to another sample cell 920c, optical coupling systems 965c and 975c are used, which completely dispense with focusing (by lenses). This embodiment is somewhat "light weak", but is characterized by a particularly high insensitivity to unwanted relative rotations of the involved sample cells 920c and 960c. The "light weakness" may be at least partially compensated by the advantageous use of a double-stack diode described above.

Figure 9D:
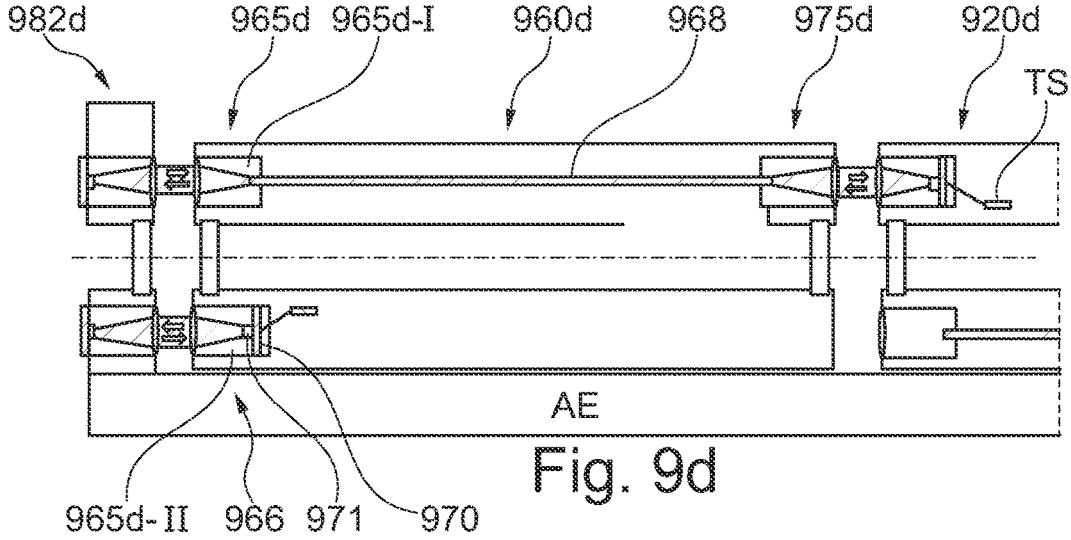

In the embodiment of a sample cell 960d shown in FIG. 9d, which is optically coupled to a stationary transmitting/receiving device 982d, the two optical coupling systems 965d and 975d each have two optical windows. A first optical window of the coupling system 965d is designated by the reference sign 965d-I. The second optical window of the coupling system 965d is designated by the reference sign 965d-II. The first optical window 965d-I is used to forward the optical signals to another sample cell 920d. The second optical window 965-II is used to feed optical signals to and from the stationary transmitting/receiving device 982d, respectively.

It is noted that in this document, the term "comprise" does not exclude other elements and that the "a" does not exclude a plurality. Also, elements described in connection with different exemplary embodiments may be combined. It should also be noted that reference signs in the claims should not be construed as limiting the scope of the claims.

REFERENCE SIGNS

LS light source
PSG polarization state generator
AE receiving equipment
PSA polarization state analyzer
Det detector
$\mu$C evaluation and control unit
TS temperature sensor
100 optical measuring device
105 analysis beam path/measuring light/optical axis
120 first measuring cell/first calibration cell
122 reference element receptacle
123 optical reference element/quartz disc
124 further reference element receptacle
125 further optical reference element/quartz disc
130 mobile transmitting/receiving system
130a communication channel
140 second measuring cell/second calibration cell
142 reference element receptacle
143 optical reference element/quartz disc
150 mobile transmitting/receiving system
150a communication channel
180 stationary transmitting/receiving system
182 first stationary transmitting/receiving device
184 second stationary transmitting/receiving device
220 first measuring cell/first sample cell
221 sample volume/sample
240 second measuring cell/second sample cell
241 sample volume/sample
363 rotary drive
364 memory
384 stationary transmitting/receiving device
388 stationary transmitting/receiving units
400 optical measuring device
420 first measuring cell/first sample cell
421 sample volume/sample
430 mobile transmitting/receiving system
440 second measuring cell/second sample cell
441 sample volume/sample
450 mobile transmitting/receiving system
460 third measuring cell/second sample cell
461 sample volume/sample 470 mobile transmitting/receiving system
480 stationary transmitting/receiving system
482 first stationary transmitting/receiving device
484 second stationary transmitting/receiving device
486 third stationary transmitting/receiving device
500 optical measuring device
520 first measuring cell/first sample cell
530 first mobile transmitting/receiving system
532 second mobile transmitting/receiving system
540 second measuring cell/second sample cell
550 first mobile transmitting/receiving system
552 second mobile transmitting/receiving system
560 third measuring cell/second sample cell
570 first mobile transmitting/receiving system
572 second mobile transmitting/receiving system
582 first stationary transmitting/receiving device
584 second stationary transmitting/receiving device
600 optical measuring device
680 stationary transmitting/receiving system
730*a/b* (mobile) transmitting/receiving system
ED double-stack diode/double-stack LED
C capacitor
Vcc supply voltage
GND ground potential
MC microcontroller
IC integrated circuit
D diode
SD light emitting diode/transmitting diode
S switching element
800 optical measuring device
811 first tempering device/first Peltier element
811*a* thermal coupling
812 second tempering device/second Peltier element
812*a* thermal coupling
813 third tempering device/third Peltier element
813*a* thermal coupling
815 common heat sink
940*a*/sample cell
960*a/b/c/d* sample cell
920*b/c/d* sample cell
961 sample volume/sample
965*a-d* optical coupling system
965*d*-I first optical window
965*d*-II second optical window
966 lens
967 beam splitter
968 optical waveguide
970 mobile transmitting/receiving system
971 transmitting/receiving diode
975*a/b/c/d* optical coupling system
976 lens
982*b/c/d* stationary transmitting/receiving device
990 entrainment structure
991 entrainment element
992 engagement opening

The invention claimed is:
1. An optical measuring device for determining polarization-optical properties of a sample, the optical measuring device comprising
a polarization state generator configured to prepare a measuring light propagating along an analysis beam path with a defined polarization state;
a receiving equipment arranged downstream of the polarization state generator in the analytical beam path and configured to receive at least a first measuring cell and a second measuring cell;
a polarization state analyzer arranged downstream of the receiving equipment in the analysis beam path;
a detector, which is arranged downstream of the polarization state analyzer in the analyzing beam path, for detecting an intensity of the measuring light;
a stationary transmitting/receiving system configured to communicate with at least one of the first measuring cell and the second measuring cell; and
an evaluation and control unit for evaluating measuring signals from the detector and/or from the polarization state analyzer and/or from the polarization state generator, taking into account information communicated between the stationary transmitting/receiving system and at least one of the two measuring cells
wherein at least one of the following features applies:
wherein the stationary transmitting/receiving system is mounted to a chassis of the optical measuring device such that the stationary transmitting/receiving system is spaced apart from the first measuring cell and/or from the second measuring cell along a direction perpendicular to the optical axis of the measuring light;
wherein the stationary transmitting/receiving system is further configured to transfer energy to the first measuring cell and/or to the second measuring cell;
wherein the optical measuring device further comprises a first tempering device arranged and configured to temper the first measuring cell, and a second tempering device arranged and configured to temper the second measuring cell;
wherein the stationary transmitting/receiving system comprises at least one multi-stack diode.
2. The optical measuring device according to claim 1, wherein
the stationary transmitting/receiving system is configured to communicate wirelessly with the first measuring cell and/or with the second measuring cell; and/or
the stationary transmitting/receiving system comprises two transmitting/receiving devices, wherein a first stationary transmitting/receiving device of the two transmitting/receiving devices is associated with the first measuring cell and the second stationary transmitting/receiving device of the two transmitting/receiving devices is associated with the second measuring cell.
3. The optical measuring device according to claim 1, wherein the stationary transmitting/receiving system is mounted to a chassis of the optical measuring device such that the stationary transmitting/receiving system is spaced apart from the first measuring cell and/or from the second measuring cell along a direction parallel to the optical axis of the measuring light.
4. The optical measuring device according to claim 3, wherein the stationary transmitting/receiving system comprises a plurality of stationary transmitting/receiving units distributed along a circumference about an optical axis of the measuring light.
5. The optical measuring device according to claim 1, wherein the receiving equipment is further designed to receive a further measuring cell.
6. The optical measuring device according to claim 5, wherein the stationary transmitting/receiving system is further configured to communicate also with the further measuring cell.
7. A measuring cell for the optical measuring device of claim 6 for determining polarization-optical properties of a sample, the measuring cell comprising
a first mobile transmitting/receiving system for wirelessly communicating with a first entity in a system consisting of the optical measuring device of claim 6, the measuring cell, and optionally at least one other measuring cell wherein at least one of the following features applies:

wherein the first mobile transmitting/receiving system is configured to wirelessly receive energy;

wherein the measuring cell is configured to receive energy from a transmitting/receiving system and to transfer at least a portion of the received energy to another measuring cell;

wherein the first mobile transmitting/receiving system comprises at least one multi-stack diode;

wherein the measuring cell further comprises an entrainment structure configured to couple with another entrainment structure of another measuring cell so that when the measuring cell is rotated at out an optical axis of measuring light passing through the measuring cell and the other measuring cell, the other measuring cell is also rotated in the same manner;

wherein the measuring cell is a sample cell having a sample receptacle for receiving a sample;

wherein the measuring cell further comprises a memory for storing information specific to the measuring cell, wherein the memory is communicatively coupled to the first mobile transmitting/receiving system, and wherein the first mobile transmitting/receiving system is configured to wirelessly transmit at least some of the information to the optical measuring device.

8. The measuring cell according to claim 7, further comprising a second mobile transmitting/receiving system for wirelessly communicating with a second entity.

9. The measuring cell according to claim 8, wherein the measuring cell is a first measuring cell of at least two measuring cells, the first entity is the optical measuring device, and the second entity is a second measuring cell of the at least two measuring cells; or the measuring cell is a second measuring cell of at least three measuring cells for an optical measuring device, the first entity is a first measuring cell of the at least three measuring cells, the second entity is a third measuring cell of the at least three measuring cells.

10. The measuring cell according to claim 7, wherein the measuring cell is a calibration cell for calibrating the optical measuring device.

11. The measuring cell according to claim 10, wherein the calibration cell comprises a reference element receptacle for receiving an optical reference element, the optical reference element causing a rotation of the plane of polarization from a linearly polarized measuring light by a predetermined rotation angle.

12. The measuring cell according to claim 11, wherein the calibration cell comprises at least one further reference element receptacle for receiving a further optical reference element, the further optical reference element causing a rotation of the plane of polarization from the linearly polarized measuring light by a further predetermined rotation angle.

13. The measuring cell according to claim 7, further comprising a sensor for measuring the current value of a physical quantity of at least one component of the measuring cell, wherein the sensor is directly or indirectly coupled to the first mobile transmitting/receiving system, and wherein the first mobile transmitting/receiving system is configured to wirelessly transmit the current value to the optical measuring device.

14. The measuring cell according to claim 13, wherein the sensor is a temperature sensor and wherein the current value is a temperature value.

15. A method for determining polarization-optical properties of a sample using an optical measuring device, the optical measuring device including:

a polarization state generator configured to prepare a measuring light propagating along an analysis beam path with a defined polarization state;

a receiving equipment arranged downstream of the polarization stare generator in the analytical beam path and configured to receive at least a first measuring cell and a second measuring cell;

a polarization state analyzer arranged downstream of the receiving equipment in the analysis beam path;

a detector, which is arranged downstream of the polarization state analyzer in the analyzing beam path, for detecting an intensity of the measuring light;

a stationary transmitting/receiving system configured to communicate with at least one of the first measuring cell and the second measuring cell; and an evaluation and control unit for evaluating measuring signals from the detector and/or from the polarization state analyzer and/or from the polarization state generator, taking into account information communicated between the stationary transmitting/receiving system and at least one of the two measuring cells, the method comprising:

transmitting at least a first information, which is indicative of a state and/or type of the first measuring cell, from the first measuring cell to the stationary transmitting/receiving system;

transmitting at least a second information, which is indicative of a state and/or type of the second measuring cell, from the second measuring cell to the stationary transmitting/receiving system; and evaluating measuring signals from the detector and/or from the polarization state analyzer and/or from the polarization state generator taking into account the first information and the second information.

16. The method according to claim 15, wherein at least one of the first measuring cell and the second measuring cell is a calibration cell, wherein the calibration cell comprises a reference element receptacle and an optical reference element which is fixedly connected to the reference element receptacle, and wherein the calibration cell comprises a memory in which information characteristic of the calibration cell is stored.

17. The method according to claim 15, wherein the optical measuring device further comprises a first tempering device arranged and configured to temper the first measuring cell, and a second tempering device arranged and configured to temper the second measuring cell, and wherein both the first measuring cell and the second measuring cell are each a measuring cell further comprising a sensor for measuring the current value of a physical quantity of at least one component of the measuring cell, wherein the sensor is directly or indirectly coupled to the first mobile transmitting/receiving system, and wherein the first mobile transmitting/receiving system is configured to wirelessly transmit the current value to the optical measuring device, wherein the sensor is a temperature sensor and wherein the current value is a temperature value, the method further comprising measuring a first temperature value for the first measuring cell, wherein the first temperature value represents the first information;

measuring a second temperature value for the second measuring cell wherein the second temperature value represents the second information;

determining a variable based on the first temperature value and the second temperature value; and controlling the first tempering device and the second tempering device based on the determined variable.

18. The method according to claim 17, wherein the variable has a first variable for the first tempering device and a second variable for the second tempering device, wherein the first tempering device is controlled based on the first variable and independently of the second variable, and the second tempering device is controlled based on the second variable and independently of the first variable; or the variable is indicative of an average temperature between the first temperature value and the second temperature value, wherein the first tempering device and the second tempering device are both controlled based on the average temperature; or the variable is indicative of a weighted average temperature between (i) the first temperature value weighted by a first thermal mass of the first measuring cell and (ii) the second temperature value weighted by a second thermal mass of the second measuring cell, wherein the first tempering device and the second tempering device are both controlled based on the weighted average temperature.

* * * * *